(12) United States Patent
Kao

(10) Patent No.: US 11,190,283 B2
(45) Date of Patent: Nov. 30, 2021

(54) POLAR SYSTEM AND DELAY DIFFERENCE CALIBRATION METHOD

(71) Applicant: REALTEK SEMICONDUCTOR CORPORATION, Hsinchu (TW)

(72) Inventor: Tzu Ming Kao, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 0 days.

(21) Appl. No.: 17/033,764

(22) Filed: Sep. 26, 2020

(65) Prior Publication Data

US 2021/0211209 A1 Jul. 8, 2021

(30) Foreign Application Priority Data

Jan. 6, 2020 (TW) .................................. 109100338

(51) Int. Cl.
| | | |
|---|---|---|
| *H04B 3/46* | (2015.01) | |
| *H04L 25/49* | (2006.01) | |
| *H04B 17/12* | (2015.01) | |
| *H04B 17/10* | (2015.01) | |
| *H04B 17/13* | (2015.01) | |
| *H04B 17/14* | (2015.01) | |

(52) U.S. Cl.
CPC .......... *H04B 17/12* (2015.01); *H04B 17/104* (2015.01); *H04B 17/13* (2015.01); *H04B 17/14* (2015.01)

(58) Field of Classification Search
CPC ........ H04B 7/12; H04B 17/104; H04B 17/13; H04B 17/14
USPC ......................................... 375/224, 296, 297
See application file for complete search history.

(56) References Cited

U.S. PATENT DOCUMENTS

| | | | | |
|---|---|---|---|---|
| 7,346,122 | B1 * | 3/2008 | Cao ....................... | H03F 1/0211 375/285 |
| 9,954,626 | B2 | 4/2018 | Belitzer et al. | |
| 2005/0245208 | A1 * | 11/2005 | Udagawa ................. | H04B 1/04 455/102 |
| 2007/0009062 | A1 * | 1/2007 | Matsuura .............. | H04B 1/0475 375/296 |
| 2012/0105111 | A1 * | 5/2012 | Maeda .................. | H03F 1/0205 327/107 |
| 2020/0220526 | A1 * | 7/2020 | Testi .................. | H03H 17/0294 |

* cited by examiner

*Primary Examiner* — Don N Vo
(74) *Attorney, Agent, or Firm* — WPAT, P.C., Intellectual Property Attorneys; Anthony King

(57) ABSTRACT

The application discloses a polar system and a delay difference calibration method. The polar system includes: a calibration signal generation unit, a CORDIC, a delay difference generation unit, a transmission unit, a receiving unit, a Fourier transformer and a calibration unit. The receiving unit is configured to receive a transmission signal from the transmission unit. The Fourier transformer is configured to compute a power of a receiving signal at a specific frequency. The calibration unit is configured to control the delay difference generation unit and determine a delay difference calibration value in a calibration mode.

20 Claims, 4 Drawing Sheets

POLAR SYSTEM AND DELAY DIFFERENCE CALIBRATION METHOD

CROSS REFERENCE TO RELATED APPLICATIONS

This application claims priority of Taiwan application No. 109100338 filed on Jan. 6, 2020, which is incorporated by reference in its entirety.

BACKGROUND

Field of the Invention

The present application relates generally to a polar system; in particular, to a polar system capable of self-calibration and an associated delay difference calibration method.

Description of Related Art

For modern wireless communication systems, the polar transmitter is quite competitive in comparison with conventional analog frameworks; the polar transmitter has a smaller area and less power consumption. One disadvantage of polar systems applying the polar transmitter is that the path that the amplitude modulation signal passes through and the path that the phase modulation signal passes through are different paths, and hence the changes in the process, voltage and temperature may cause a delay mismatch between the two paths, thereby resulting in a decrease in the signal quality, and therefore, a compensation mechanism is need to address the above-mentioned issue.

BRIEF SUMMARY OF THE INVENTION

Some embodiments of the present disclosure provides a polar system, including: a calibration signal generation unit, configured to generate a test signal to a coordinate rotation digital computer (CORDIC) in a calibration mode; the CORDIC, configured to perform a coordinate rotation digital computation according to the test signal, so as to generate an amplitude modulation signal and a phase modulation signal; a delay difference generation unit, configured to adjust a delay difference between the amplitude modulation signal and the phase modulation signal, and output an adjusted amplitude modulation signal and an adjusted phase modulation signal; a transmission unit, configured to generate a transmission signal according to the adjusted amplitude modulation signal and the adjusted phase modulation signal; a receiving unit, configured to receive the transmission signal and generate a receiving signal; a Fourier transformer, configured to calculate the power of the receiving signal at a specific frequency; and a calibration unit, configured to control the delay difference generation unit and determine a delay difference calibration value according to the power of the specific frequency in the calibration mode.

Some embodiments of the present disclosure provides a delay difference calibration method, including: generating a test signal in a calibration mode; performing a coordinate rotation digital computation according to the test signal to generate an amplitude modulation signal and a phase modulation signal; adjusting a delay difference between the amplitude modulation signal and the phase modulation signal, so as to generate an adjusted amplitude modulation signal and an adjusted phase modulation signal; generating a transmission signal according to the adjusted amplitude modulation signal and the adjusted phase modulation signal; receiving the transmission signal and generating a receiving signal; calculating power of the receiving signal at a specific frequency; and determining a delay difference calibration value according to the power of the specific frequency in the calibration mode.

The polar system and the associated delay difference calibration method mitigate the delay mismatch between the amplitude modulation signal and the phase modulation signal.

BRIEF DESCRIPTION OF THE DRAWINGS

Aspects of the present disclosure are best understood from the following detailed description when read with the accompanying drawings. It is noted that, in accordance with the common practice in the field, various features are not drawn to scale. In fact, the dimensions of the various features may be arbitrarily increased or reduced for the purpose of discussion.

DETAILED DESCRIPTION

Figure 1:
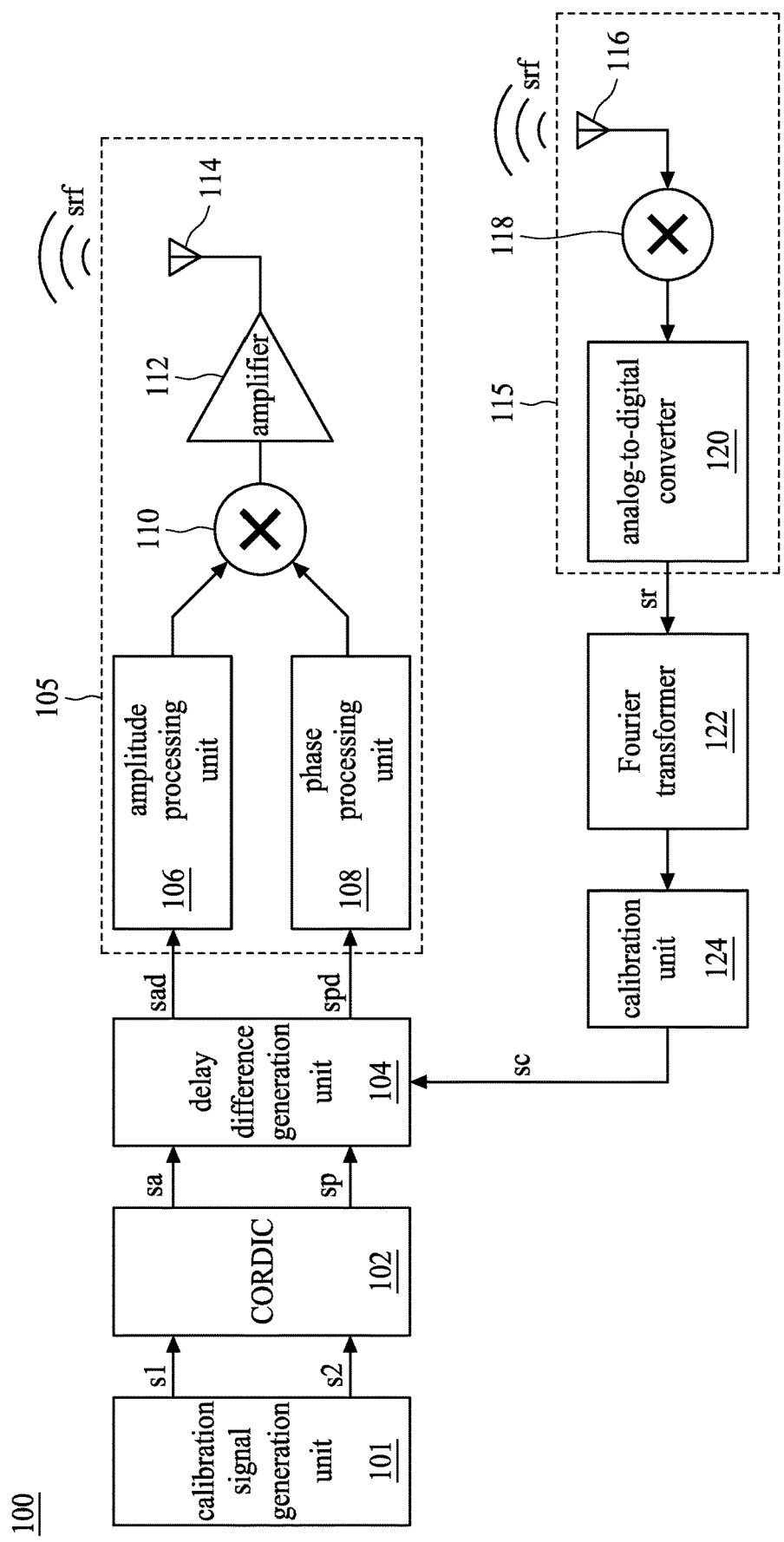
FIG. 1 is a schematic diagram of a polar system according to an embodiment of the present application.

FIG. 1 is a schematic diagram of a polar system according to embodiments of the present application. The polar system 100 estimates a delay difference (i.e., a delay difference calibration value sc) between an amplitude processing unit 106 and a phase processing unit 108 under the current environment condition in a calibration mode, and the polar system 100 compensates the delay difference in a normal mode accordingly.

The calibration signal generation unit 101 is configured to generate test signals s1 and s2 to a coordinate rotation digital computer (CORDIC) 102 in the calibration mode, whereas in the normal mode, other signal generation units (not shown in the drawing) are used to generate an in-phase signal and an orthogonal signal to the CORDIC 102, wherein the in-phase signal and the orthogonal signal have the same frequency and 90-degree phase difference therebetween. The CORDIC 102 carries out the coordinate rotation digital computation according to the test signals s1 and s2, so as to generate an amplitude modulation signal sa and a phase modulation signal sp. Before the amplitude modulation signal sa (hereinafter, the signal sa) and the phase modulation signal sp (hereinafter, the signal sp) enter the transmission unit 105, the delay of the signal sa and the delay of the signal sp are adjusted using the delay difference generation unit 104, and an adjusted amplitude modulation signal sad (hereinafter, the signal sad) and an adjusted phase modulation signal spd (hereinafter, the signal spd) are outputted; for example, the delay difference generation unit 104 may use a delay cell to delay the signal sa and/or the signal sp so as to generate the signal sad and the signal spd.

Figure 2:
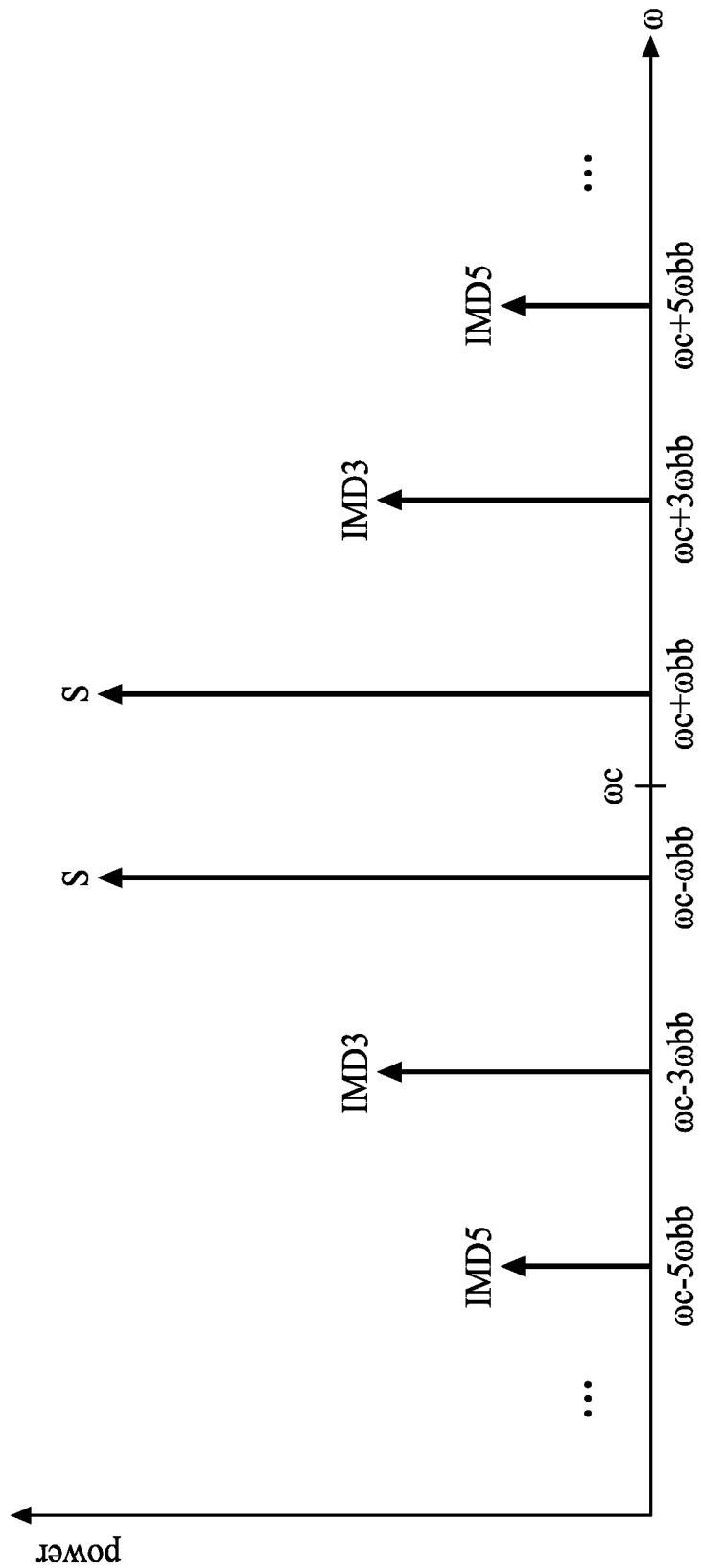
FIG. 2 is a spectrogram of the transmission signal in a calibration mode.

The transmission unit 105 is configured to generate a transmission signal srf according to the signal sad and signal spd. In the calibration mode, the test signals s1 and s2 allows the transmission signal srf to have two-tone main signals S, as shown in FIG. 2, the two-tone main signals S are shown on both sides of the carrier angular frequency ωc, wherein the angular frequencies of the two-tone main signals S are ωc+ωbb and ωc−ωbb, respectively. When the delay of the signal sad and the delay of the signal spd are not matched, intermodulation distortion (IMD) signals are generated in the frequency spectrum, wherein among the IMD signals, the IMD signals with the greatest power are two-tone third-order IMD (IMD3) signals, with frequencies of ωc+3ωbb and ωc−3ωbb, respectively; the IMD signals with the second-greatest power among the BID signals are two-tone fifth-order IMD (IMD5) signals, with frequencies of ωc+5ωbb and ωc−5ωbb, respectively, and so on. Although the angular frequency is used in FIG. 2, it can be converted to frequency.

Since the occurrence of the MID signals is the result of the mismatch between the delay of the signal sad and the delay of the signal spd, the present application uses the IMD signals as the indicator to calibrate the above-mentioned delay mismatch; for example, the strongest IMD3 signal among the IMD signals are used as the basis for determination, in other words, find the delay difference calibration value sc that minimizes the IMD3 signals. Also, the present application does not pose other limitations to the content of the test signals s1 and s2, as long as they can generate the two-tone main signals S; for example, one of the test signals s1 and s2 can be set as an in-phase signal cos(ωbb·t) or an orthogonal signal sin(ωbb·t), whereas the other of the test signals s1 and s2 can be set as 0.

In the transmission unit 105, the amplitude processing unit 106 is configured to process the signal sad, for example, it performs the digital-to-analog conversion to the signal sad. The phase processing unit 108 is configured to process the signal sap, for example, it performs the phase modulation to the signal sap according to the carrier angular frequency ωc. The two signals that are processed by the amplitude processing unit 106 and the phase processing unit 108 respectively are combined by a combiner 110, and then amplified by an amplifier 112 and converted into a transmission signal srf (e.g., radio frequency signal) by an antenna 114.

Both of the receiving unit 115 and the transmission unit 105 are disposed in the polar system 100; in the normal mode, the receiving unit 115 is often configured to receive the signal sent from a peer terminal; yet in the calibration mode, the receiving unit 115 is used together with the transmission unit 105 to form external loopback. Specifically, in the normal mode, the signal received by the antenna 116 enters the in-phase signal path and the orthogonal signal; however, for the sake of brevity, only the part that is required in the calibration mode (i.e., one of the in-phase signal path and the orthogonal signal path) is shown in the polar system 100, wherein both the in-phase signal path and the orthogonal signal path include a frequency mixer 118, an analog-to-digital converter 120 and the Fourier transformer 122, and either one of the paths can be used in the calibration mode.

After the antenna 116 receives the transmission signal srf, the antenna 116 uses the frequency mixer 118 and the analog-to-digital converter 120 to generate a receiving signal sr, and the Fourier transformer 122 is configured to calculate the power of the receiving signal sr at the frequency of the IMD signals; for example, when the frequency of the IMD3 signals is to be used as the basis for the following determination step, then the Fourier transformer 122 may calculate the power of the angular frequency ωc+3ωbb. The calibration unit 124 then determines the delay difference calibration value sc according to the power of the frequency of the IMD signal and controls the delay difference generation unit 104. Method for controlling the delay difference generation unit 104 using the calibration unit 124 is discussed in detail below.

Figure 3:
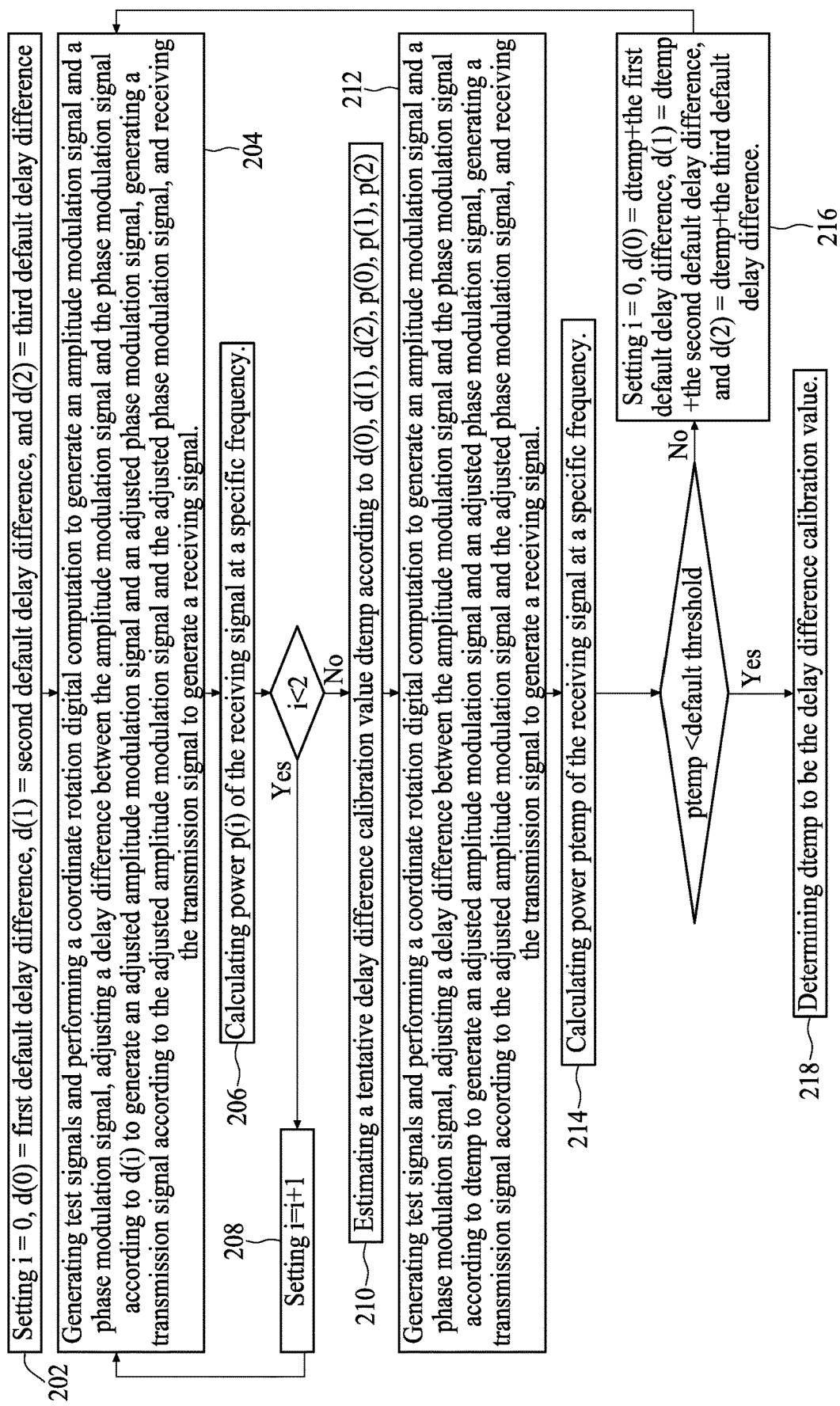
FIG. 3 is a flow chart illustrating a delay difference calibration method of an embodiment of the present application.

FIG. 3 is a flow chart illustrating the delay difference calibration method according to embodiments of the present application. First, in step 202, sampling points d(0), d(1), d(2) are set. In particular, set i=0, d(0)=first default delay difference, d(1)=second default delay difference, and d(2)= third default delay difference; for example, the first default delay difference=0, and the second default delay difference and the third default delay difference have the same absolute value but have opposite signs.

In step 204, the calibration signal generation unit 101 generates the test signals s1 and s2, the CORDIC 102 carries out a coordinate rotation digital computation so as to generate the signal sa and the signal sp, and the calibration unit 124 controls the delay difference generation unit 104 according to d(i) so as to adjusts the delay difference between the signal sa and the signal sp; e.g., when i=0, the delay difference between the signal sa and the signal sp is increased by d(0) to generate a signal sad and a signal spd. Next, the transmission unit 105 generates a transmission signal srf according to the signal sad and the signal spd, and the receiving unit 115 receives the transmission signal srf and generates a receiving signal sr.

In step 206, the Fourier transformer 122 calculates the power p(i) of the receiving signal sr at the frequency of the MID signals. If i<2, then in step 208, it is set that i=i+1, and step 204 to step 206 are repeated until the powers p(0), p(1), p(2) corresponding to the sampling points d(0), d(1), d(2) are obtained.

Figure 4:
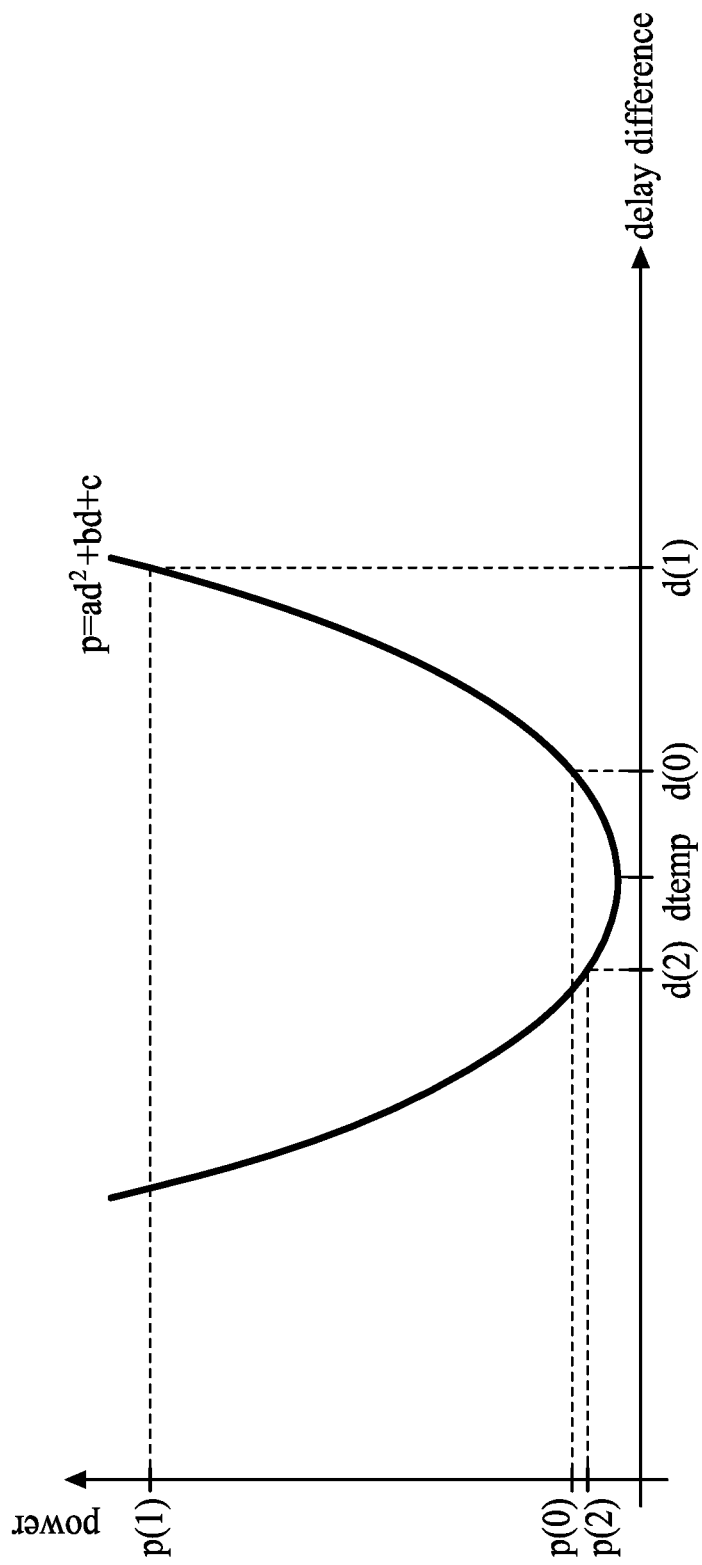
FIG. 4 is a schematic diagram illustrating using a quadratic function as the model for estimating a tentative delay difference calibration value according to the present application.

Next, in step 210, the calibration unit 124 estimates a tentative delay difference calibration value dtemp according to d(0), d(1), d(2), p(0), p(1), p(2); for example, it is feasible to use a quadratic function as the model for estimating the tentative delay difference calibration value dtemp; as shown in FIG. 4, assuming that the relation of the adjustment of the delay difference d between the signal sa and the signal sp and the correspondingly generated power p of the frequency of the IMD signals is a quadratic function of: p=ad2+bd+c, then d(0), d(1), d(2), p(0), p(1), and p(2) are used to calculate a delay difference corresponding to the vertex of the quadratic function as the tentative delay difference calibration value dtemp. It should be noted that the present application is not limited to the use of a quadratic function for estimating the tentative delay difference calibration value dtemp; moreover, it is also feasible to include more sampling points, e.g., incorporating d(3)=fourth default delay difference, to increase the accuracy of the tentative delay difference calibration value dtemp.

The difference between the step 212 and step 204 lies in the step 212, in which the calibration unit 124 controls the delay difference generation unit 104 to adjust the delay difference between the signal sa and the signal sp according to a tentative delay difference calibration value dtemp, so that in step 214, the Fourier transformer 122 can calculate the power ptemp of the receiving signal sr at the frequency of IMD signals correspondingly.

Different from the ideal condition, in fact, the tentative delay difference calibration value dtemp thus obtained may not be the optimal one because, for example, the first default delay difference, the second default delay difference and the third default delay difference are too far away from the vertex of the quadratic function. If the power ptemp is not smaller than the default threshold, then it is set that i=0, d(0)=dtemp+the first default delay difference, d(1)=dtemp+ the second default delay difference, and d(2)=dtemp+the third default delay difference, and the step 204 to step 214 are repeated to update the power ptemp, until the power ptemp is smaller than the default threshold; in this way, the delay difference calibration value sc is set as the tentative delay difference calibration value dtemp of the power ptemp that is smaller than the default threshold, as in step 218.

In the normal mode, the calibration unit 124 will keep controlling the delay difference generation unit 104 according to the delay difference calibration value sc, until the next tine that it re-enters the calibration mode.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments disclosed herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A polar system, comprising:
   a calibration signal generation unit, configured to generate a test signal to a coordinate rotation digital computer (CORDIC) in a calibration mode;
   the CORDIC, configured to perform a coordinate rotation digital computation according to the test signal, so as to generate an amplitude modulation signal and a phase modulation signal;
   a delay difference generation unit, configured to adjust a delay difference between the amplitude modulation signal and the phase modulation signal, and output an adjusted amplitude modulation signal and an adjusted phase modulation signal;
   a transmission unit, configured to generate a transmission signal according to the adjusted amplitude modulation signal and the adjusted phase modulation signal;
   a receiving unit, configured to receive the transmission signal and generate a receiving signal;
   a Fourier transformer, configured to calculate the power of the receiving signal at a specific frequency; and
   a calibration unit, configured to control the delay difference generation unit and determine a delay difference calibration value according to the power of the specific frequency in the calibration mode.

2. The polar system of claim 1, wherein in the calibration mode, the test signal allows the transmission signal to have two-tone main signals.

3. The polar system of claim 2, wherein in the calibration mode, the specific frequency is a third-order intermodulation distortion frequency.

4. The polar system of claim 2, wherein in the calibration mode, the calibration unit controls the delay difference generation unit according to a first default delay difference, a second default delay difference and a third default delay difference to output the adjusted amplitude modulation signal and the adjusted phase modulation signal, so that the Fourier transformer generates a first power, a second power and third power, correspondingly.

5. The polar system of claim 4, wherein the calibration unit estimates a tentative delay difference calibration value according to the first default delay difference, the second default delay difference and the third default delay difference, and the first power, the second power and the third power.

6. The polar system of claim 5, wherein the calibration unit estimates the tentative delay difference calibration value according to the first default delay difference, the second default delay difference and the third default delay difference, and the first power, the second power and the third power based on a quadratic function.

7. The polar system of claim 6, wherein in the calibration mode, the calibration unit controls the delay difference generation unit according to the tentative delay difference calibration value to output the adjusted amplitude modulation signal and the adjusted phase modulation signal, so that the Fourier transformer generates a fourth power correspondingly, and when the fourth power is smaller than a default threshold, the calibration unit determines that the tentative delay difference calibration value to be the delay difference calibration value.

8. The polar system of claim 7, wherein when the fourth power is not smaller than the default threshold, the calibration unit updates the first default delay difference, the second default delay difference and the third default delay difference according to the tentative delay difference calibration value.

9. The polar system of claim 8, wherein the calibration unit controls the delay difference generation unit according to the delay difference calibration value in a normal mode.

10. The polar system of claim 1, wherein the transmission unit comprises:
    an amplitude processing unit;
    a phase processing unit;
    a combiner, wherein the adjusted amplitude modulation signal and the adjusted phase modulation signal form a combined signal by the combiner after passing through the amplitude processing unit and the phase processing unit, respectively; and
    an amplifier, configured to adjust power of the combined signal to generate an amplified combined signal;
    an antenna, configured to generate the transmission signal according to the amplified combined signal.

11. A delay difference calibration method, comprising:
    generating a test signal in a calibration mode;
    performing a coordinate rotation digital computation according to the test signal to generate an amplitude modulation signal and a phase modulation signal;
    adjusting a delay difference between the amplitude modulation signal and the phase modulation signal, so as to generate an adjusted amplitude modulation signal and an adjusted phase modulation signal;
    generating a transmission signal according to the adjusted amplitude modulation signal and the adjusted phase modulation signal;
    receiving the transmission signal and generating a receiving signal;
    calculating power of the receiving signal at a specific frequency; and
    determining a delay difference calibration value according to the power of the specific frequency in the calibration mode.

12. The method of claim 11, wherein the generation of the test signal in the calibration mode comprises:
    generating the test signal in the calibration mode to allow the transmission signal has two-tone main signals.

13. The method of claim 12, wherein in the calibration mode, the specific frequency is a third-order intermodulation distortion frequency.

14. The method of claim 12, wherein the adjusting the delay between the amplitude modulation signal and the phase modulation signal, so as to generate the adjusted amplitude modulation signal and the adjusted phase modulation signal comprises:

adjusting the delay difference between the amplitude modulation signal and the phase modulation signal according to the first default delay difference, the second default delay difference and the third default delay difference to generate the adjusted amplitude modulation signal and the adjusted phase modulation signal, so as to generate a first power, a second power and a third power correspondingly.

15. The method of claim 14, wherein the determining the delay difference calibration value according to the power of the specific frequency in the calibration mode comprises:

estimating a tentative delay difference calibration value according to the first default delay difference, the second default delay difference and the third default delay difference, and the first power, the second power and the third power.

16. The method of claim 15, wherein the estimating a tentative delay difference calibration value according to the first default delay difference, the second default delay difference and the third default delay difference, and the first power, the second power and the third power comprises:

estimating the tentative delay difference calibration value according to the first default delay difference, the second default delay difference and the third default delay difference, and the first power, the second power and the third power based on a quadratic function.

17. The method of claim 16, wherein the adjusting the delay between the amplitude modulation signal and the phase modulation signal to generate the adjusted amplitude modulation signal and the adjusted phase modulation signal, calculate the power of the receiving signal at the specific frequency, and determine the delay difference calibration value according to the power of the specific frequency in the calibration mode further comprises:

outputting the adjusted amplitude modulation signal and the adjusted phase modulation signal according to the tentative delay difference calibration value in the calibration mode, so as to generate a fourth power correspondingly, wherein when the fourth power is smaller than a default threshold, determining the tentative delay difference calibration value to be the delay difference calibration value.

18. The method of claim 17, wherein the adjusting the delay between the amplitude modulation signal and the phase modulation signal to generate the adjusted amplitude modulation signal and the adjusted phase modulation signal, calculate the power of the receiving signal at the specific frequency, and determine the delay difference calibration value according to the power of the specific frequency in the calibration mode further comprises:

when the fourth power is not smaller than the default threshold, updating the first default delay difference, the second default delay difference and the third default delay difference according to the tentative delay difference calibration value.

19. The method of claim 18, further comprising:

controlling the delay difference generation unit according to the delay difference calibration value in a normal mode.

20. The method of claim 11, wherein the generating the transmission signal according to the adjusted amplitude modulation signal and the adjusted phase modulation signal comprises:

generating a combined signal after performing an amplitude process and a phase process to the adjusted amplitude modulation signal and the adjusted phase modulation signal, respectively; and adjusting power of the combined signal to generate the transmission signal.

* * * * *